United States Patent
Kaliyamoorthy

(10) Patent No.: US 11,223,557 B1
(45) Date of Patent: Jan. 11, 2022

(54) MULTICAST TRAFFIC DISRUPTION PREVENTION SYSTEM

(71) Applicant: Dell Products L.P., Round Rock, TX (US)

(72) Inventor: Karthi Kaliyamoorthy, Chengalpattu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/002,844

(22) Filed: Aug. 26, 2020

(51) Int. Cl.
*H04L 12/707* (2013.01)
*H04L 12/775* (2013.01)

(52) U.S. Cl.
CPC .............. *H04L 45/24* (2013.01); *H04L 45/58* (2013.01)

(58) Field of Classification Search
CPC ......... H04L 45/24; H04L 45/28; H04L 45/30; H04L 45/302; H04L 45/72; H04L 45/74; H04L 45/741; H04L 45/745; H04L 45/58
See application file for complete search history.

(56) References Cited

U.S. PATENT DOCUMENTS

| | | | | |
|---|---|---|---|---|
| 5,473,599 A * | 12/1995 | Li | ....................... | G06F 11/2005 370/219 |
| 6,751,191 B1 * | 6/2004 | Kanekar | ............. | H04L 12/4641 370/217 |
| 7,227,872 B1 * | 6/2007 | Biswas | ............. | H04L 29/12367 370/465 |
| 7,859,992 B2 * | 12/2010 | Buchko | ................... | H04L 45/00 370/217 |
| 7,990,852 B1 * | 8/2011 | Cirkovic | ................ | H04L 45/00 370/228 |
| 9,077,617 B1 * | 7/2015 | Seth | ....................... | H04L 69/40 |
| 2003/0233473 A1 * | 12/2003 | Bonhomme | ............ | H04L 45/00 709/238 |
| 2006/0149851 A1 * | 7/2006 | Matsumoto | ............. | H04L 45/28 709/238 |

(Continued)

OTHER PUBLICATIONS

Fenner et al., "Protocol Independent Multicast—Sparse Mode (PIM-SM): Protocol Specification (Revised)," Network Working Group, Request for Comments: 4601, Category: Standards Track, Aug. 2006, 150 pages https//tools.ietf.org/html/rfc4601.

(Continued)

*Primary Examiner* — Kevin D Mew
(74) *Attorney, Agent, or Firm* — Joseph Mencher

(57) ABSTRACT

A multicast traffic disruption prevention system includes a first router having a first priority and operating as a designated router such that a second router transmits data traffic to the first router device for forwarding to a destination. A third router coupled to the second router also has the first priority and, in response to a link to the destination device becoming available, transmits an active designated router discovery communication to the first router that identifies the first priority of the third router. In response to receiving an active designated router confirmation communication from the first router that identifies that the first router also has the first priority and that the first router is configured to operate as the designated router, the third router operates as a non-designated router such that the second router continues to transmit data traffic to the first router for forwarding to the destination device.

20 Claims, 16 Drawing Sheets

(56) References Cited

U.S. PATENT DOCUMENTS

| | | | | |
|---|---|---|---|---|
| 2007/0008880 A1* | 1/2007 | Buchko | ............... | H04L 45/586 370/218 |
| 2007/0091793 A1* | 4/2007 | Filsfils | ............... | H04L 45/22 370/228 |
| 2009/0016215 A1* | 1/2009 | Nadas | ............... | H04L 45/02 370/230 |
| 2009/0154340 A1* | 6/2009 | Kumaresan | ............... | H04L 45/586 370/218 |
| 2010/0182926 A1* | 7/2010 | Kubota | ............... | H04L 45/22 370/252 |
| 2011/0242968 A1* | 10/2011 | Cirkovic | ............... | H04L 45/22 370/221 |
| 2011/0292933 A1* | 12/2011 | Perez | ............... | H04L 45/28 370/389 |
| 2012/0263035 A1* | 10/2012 | Nakanishi | ............... | H04L 45/28 370/225 |
| 2013/0259472 A1* | 10/2013 | Gebhard | ............... | H04L 45/74 398/45 |
| 2014/0075048 A1* | 3/2014 | Yuksel | ............... | H04L 45/28 709/242 |
| 2015/0063360 A1* | 3/2015 | Thakkar | ............... | H04L 49/70 370/400 |
| 2017/0155577 A1* | 6/2017 | Zhang | ............... | H04L 43/0817 |
| 2019/0182182 A1* | 6/2019 | Mishra | ............... | H04L 12/1863 |
| 2019/0334811 A1* | 10/2019 | Raj | ............... | H04L 45/12 |

OTHER PUBLICATIONS

Fenner et al., "Protocol Independent Multicast—Sparse Mode (PIM-SM): Protocol Specification (Revised)," Internet Engineering Task Force (IETF), Request for Comments: 7761, Category: Standards Track, ISSN: 2070-1721, Mar. 2016, 137 pages https://tools.ietf.org/html/rfc7761.

Zhang et al., "PIM DR Improvement draft-ietf-pim-dr-improvement-08-txt," PIM WG, Internet-Draft, Intended Status: Standards Track, Aug. 15, 2019, Expires: Feb. 16, 2020, 13 pages, https://tools.ietf.org/html/draft-ietf-pim-dr-improvement-08.

Mankamana, Mishra "PIM Backup Designated Router Procedure draft-mankamana-pim-bdr-01," Network Working Group, Internet Draft, Intended Status: Informational, Oct. 22, 2019, Expires: Apr. 25, 2019, 5 pages https://tools.ietf.org/id/draft-mankamana-pim-bdr-01.html.

* cited by examiner

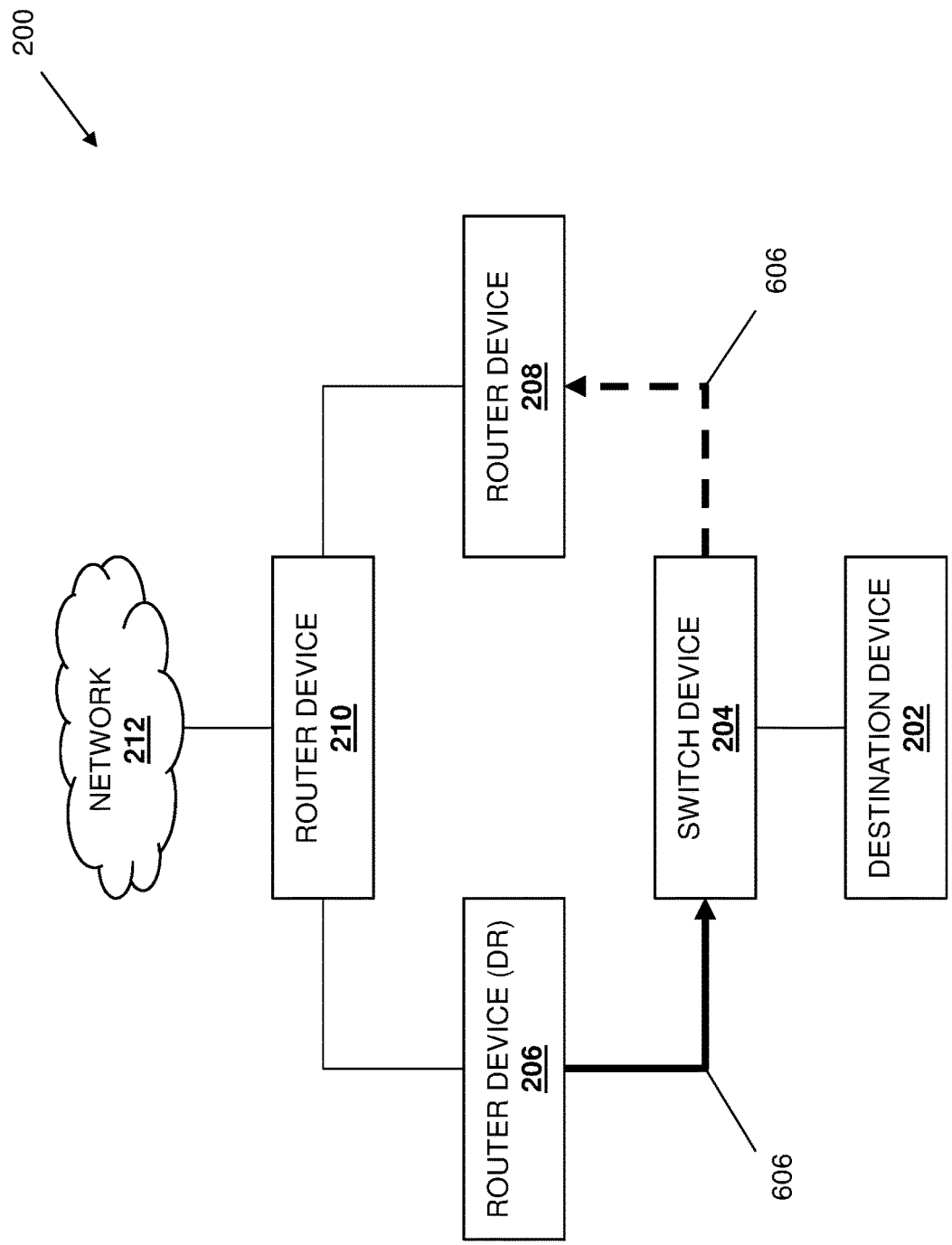

MULTICAST TRAFFIC DISRUPTION PREVENTION SYSTEM

BACKGROUND

The present disclosure relates generally to information handling systems, and more particularly to preventing multicast traffic disruptions in information handling systems utilizing multicasting protocols such as Protocol Independent Multicast (PIM).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, router devices and/or other networking devices known in the art, sometimes utilize multicasting protocols such as Protocol Independent Multicast (PIM) (e.g., via a PIM Sparse Mode (PIM-SM) algorithm) in order to provide for the forwarding of data traffic (e.g., Broadcast/Unicast/Multicast (BUM) data traffic) via ports and/or other interfaces on the router device. As will be appreciated by one of skill in the art, PIM may provide for the forwarding of BUM data traffic first based on relative priorities of the router devices that are available to forward that BUM data traffic and, in the event those priorities are the same, based on Internet Protocol (IP) addresses utilized by those router devices. For example, PIM provides for the designation of the router device with the highest priority as the Designated Router (DR) that will be utilized to handle BUM data traffic, while designating the other router device(s) as the Non-Designated Router (NON-DR) that will not be utilized to handle BUM data traffic, and if the priorities are the same, will designate the router devices as the DR and the NON-DR(s) using an IP address comparison scheme that "ranks" those IP addresses relative to each other. The designation of the DR in the manner discussed above can raise some issues.

For example, many networked systems including router devices like those discussed above will be configured such that each of the router devices has a default priority that is the same across those router devices. As such, after a PIM/multicast topology convergence in a Local Area Network (LAN) segment including the default-priority-configured router devices discussed above, each time a router device with a "higher ranked" IP address provides a link that is available for forwarding BUM data traffic, a DR re-election will be triggered to elect that router device as the DR, and its link will subsequently be used for forwarding BUM data traffic. As will be appreciated by one of skill in the art, each time such a PIM re-convergence is triggered, relatively considerable processing is required by the router devices to perform multicast tree flushes, membership state rebuilds, multicast tree building to the BUM data traffic source or a rendezvous point, hardware port state reprogramming, DR role re-election, and/or other PIM re-convergence operations known in the art. Furthermore, during such PIM re-convergences, BUM data traffic disturbances may occur that can lead to BUM data traffic losses.

Accordingly, it would be desirable to provide a multicast traffic disruption prevention system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a multicast traffic disruption prevention engine that is configured to: transmit, in response to a link to a destination device becoming available to the processing system, an active designated router discovery communication to a first router device that identifies a first priority associated with the IHS; receive an active designated router confirmation communication from the first router device that identifies that the first priority is also associated with the first router device and that the first router device is configured to operate as a designated router such that a second router device transmits data traffic to the first router device for forwarding to the destination device; and operate, in response to the first priority being associated with both the IHS and the first router device and the first router device being configured to operate as the designated router, as a non-designated router such that the second router device continues to transmit data traffic to the first router device for forwarding to the destination device.

BRIEF DESCRIPTION OF THE DRAWINGS

FIG. 6D is a schematic view illustrating an embodiment of the multicast traffic disruption prevention system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
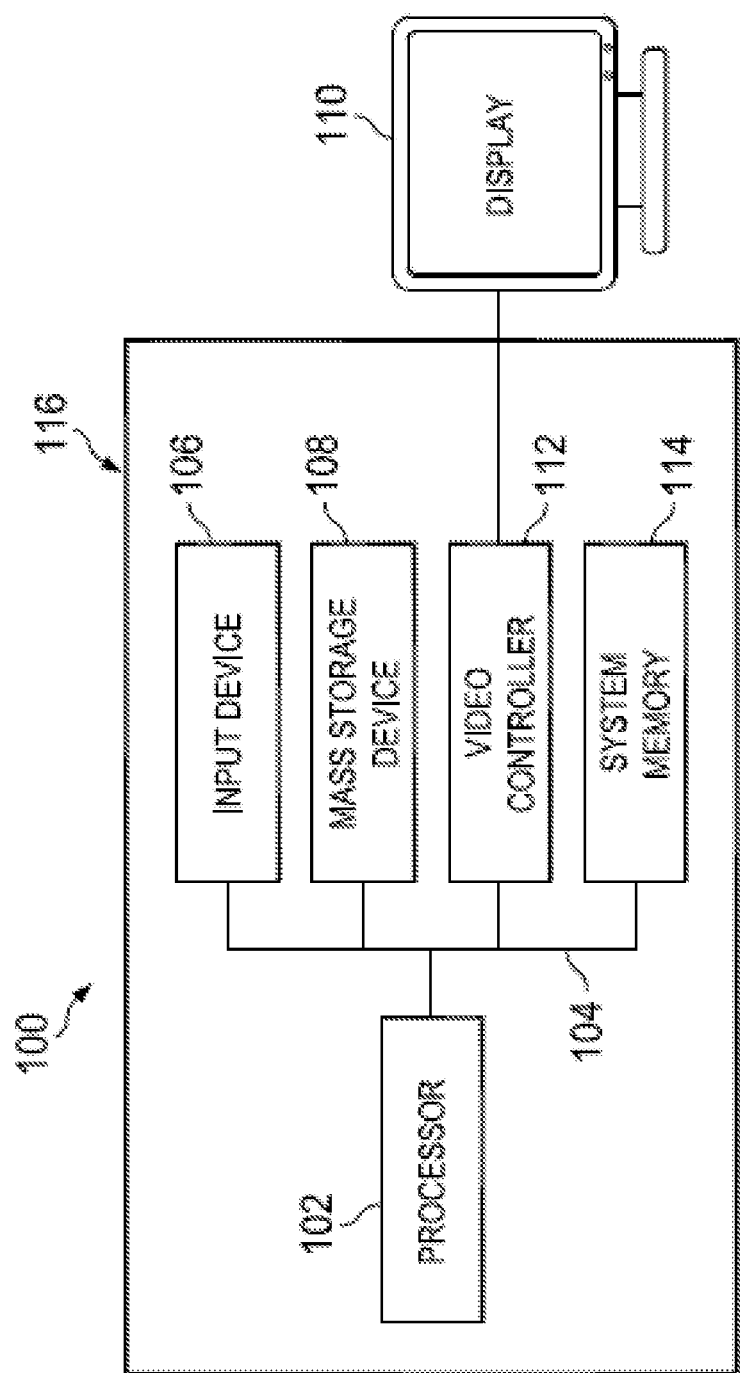
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
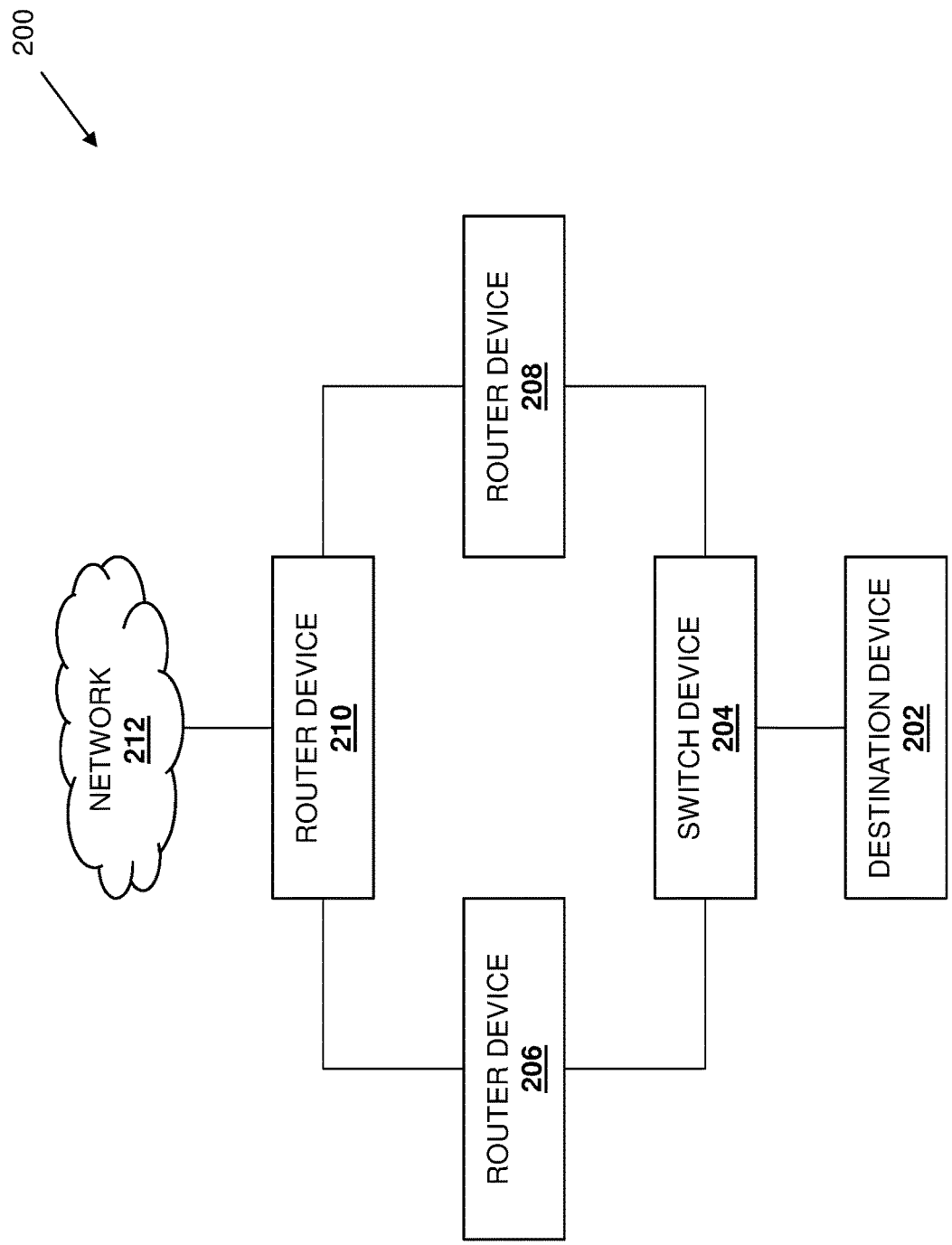
FIG. 2 is a schematic view illustrating an embodiment of a multicast traffic disruption prevention system.

Referring now to FIG. 2, an embodiment of a multicast traffic disruption prevention system 200 is illustrated. In the illustrated embodiment, the multicast traffic disruption prevention system 200 includes a destination device 202. In an embodiment, the destination device 202 may be provided by the IHS 100 discussed above with reference to FIG. 1, and/or may include some or all of the components of the IHS 100, and in specific examples may be provided by a server device, host device, and/or other destination devices that would be apparent to one of skill in the art in possession of the present disclosure. However, while illustrated and discussed as being provided by a server device, one of skill in the art in possession of the present disclosure will recognize that destination devices provided in the multicast traffic disruption prevention system 200 may include any devices that may be configured to operate similarly as the destination device 202 discussed below.

In the illustrated embodiment, the multicast traffic disruption prevention system 200 also includes a switch device 204 that is coupled to the destination device 202. In an embodiment, the switch device 204 may be provided by the IHS 100 discussed above with reference to FIG. 1, and/or may include some or all of the components of the IHS 100, and in specific examples may be provided by a Top Of Rack (TOR) switch device and/or other networking devices that would be apparent to one of skill in the art in possession of the present disclosure. However, while illustrated and discussed as being provided by a TOR switch device, one of skill in the art in possession of the present disclosure will recognize that switch devices and/or other networking devices provided in the multicast traffic disruption prevention system 200 may include any devices that may be configured to operate similarly as the switch device 204 discussed below.

In the illustrated embodiment, the multicast traffic disruption prevention system 200 also includes a pair of router devices 206 and 208 that, as discussed below, may already be coupled to the switch device 204 prior to the method 400, or may be coupled to the switch device 204 during the method 400. In an embodiment, either or both of the router devices 206 and 208 may be provided by the IHS 100 discussed above with reference to FIG. 1, and/or may include some or all of the components of the IHS 100, and in a specific example are configured to utilize a multicast protocol such as PIM. However, while illustrated and discussed as being provided by router devices, one of skill in the art in possession of the present disclosure will recognize that the multicast traffic disruption prevention system 200 may include any devices that may be configured to operate similarly as the router devices 206 and 208 discussed below. The multicast traffic disruption prevention system 200 also includes a router device 210 that is coupled to each of the router devices 206 and 208, as well as to a network 212 such as a Local Area Network (LAN), the Internet, combinations thereof, and/or other networks that would be apparent to one of skill in the art in possession of the present disclosure.

In an embodiment, the router device 210 may be provided by the IHS 100 discussed above with reference to FIG. 1, and/or may include some or all of the components of the IHS 100, and in specific examples may be provided by a router device that is configured to utilize a multicast protocol such as PIM, and that operates as a rendezvous point in the embodiments discussed below. However, while illustrated and discussed as being provided by a router device configured as a rendezvous point, one of skill in the art in possession of the present disclosure will recognize that the multicast traffic disruption prevention system 200 may include any devices (e.g., a source device) that may be configured to operate similarly as the router device 210 discussed below. However, while a specific multicast traffic disruption prevention system 200 has been illustrated and described, one of skill in the art in possession of the present disclosure will recognize that the multicast traffic disruption prevention system of the present disclosure may include a variety of components and component configurations while remaining within the scope of the present disclosure as well.

Figure 3:
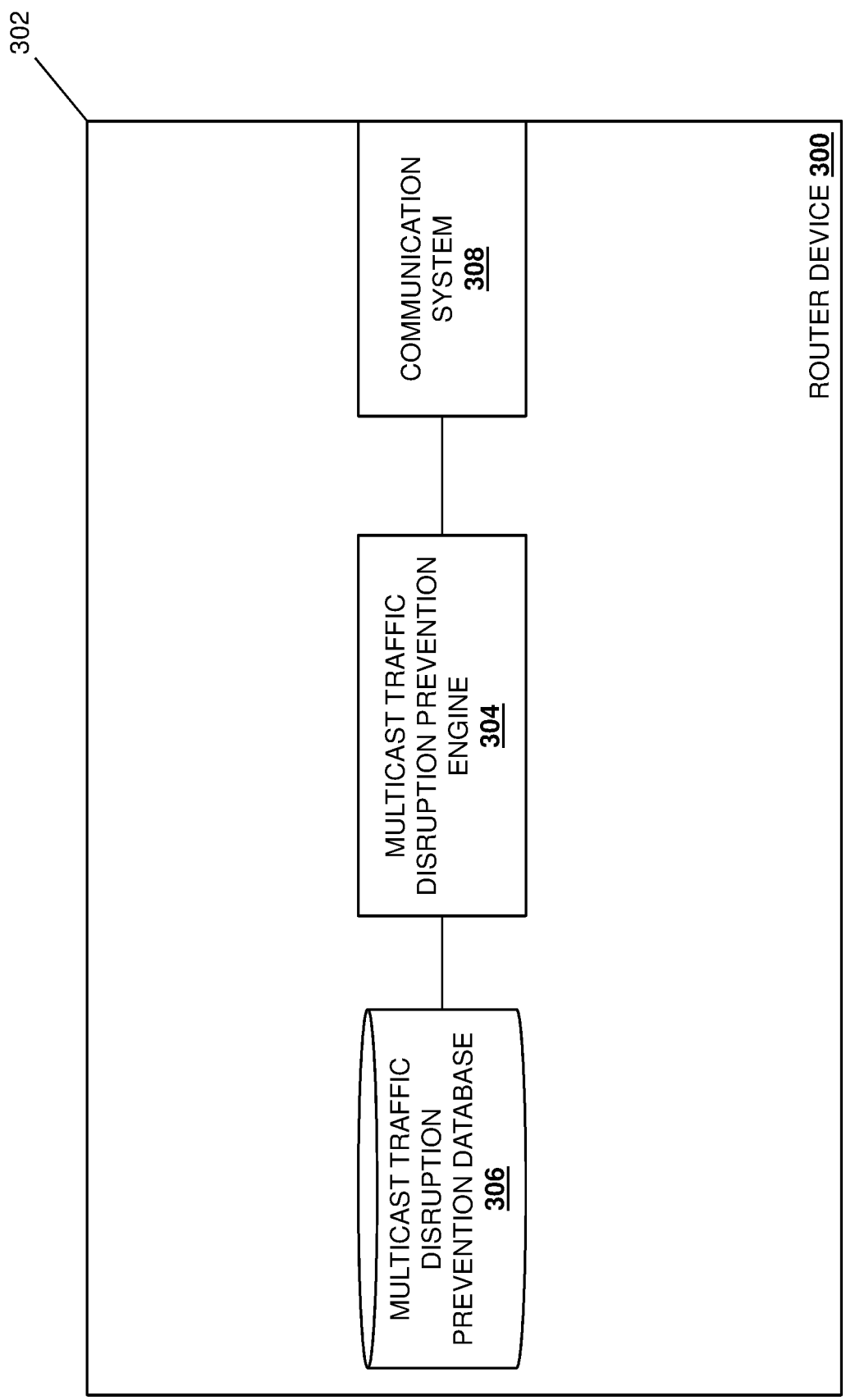
FIG. 3 is a schematic view illustrating an embodiment of a router device that may be provided in the multicast traffic disruption prevention system of FIG. 2.

Referring now to FIG. 3, an embodiment of a router device 300 is illustrated that may provide either or both of the router devices 206 and 208 discussed above with reference to FIG. 2. As such, the router device 300 may be provided by the IHS 100 discussed above with reference to FIG. 1 and/or may include some or all of the components of the IHS 100, and in specific examples may utilize a multicast protocol such as PIM. Furthermore, while illustrated and discussed as being provided by a router device, one of skill in the art in possession of the present disclosure will recognize that the functionality of the router device 300 discussed below may be provided by other devices that are configured to operate similarly as the router device 300 discussed below. In the illustrated embodiment, the router device 300 includes a chassis 302 that houses the components of the router device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a multicast traffic disruption prevention engine 304 (e.g., a Protocol Independent Multicast (PIM) traffic disruption prevention engine) that is configured to perform the functionality of the PIM traffic disruption prevention engines, multicast traffic disruption prevention engines, and/or router devices discussed below.

The chassis 302 may also house a storage system (not illustrated, but which may include the storage 108 discussed above with reference to FIG. 1) that is coupled to the multicast traffic disruption prevention engine 304 (e.g., via a coupling between the storage system and the processing system) and that includes a multicast traffic disruption prevention database 306 that is configured to store any of the information utilized by the multicast traffic disruption prevention engine 304 discussed below. The chassis 302 may also house a communication system 308 that is coupled to the multicast traffic disruption prevention engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific router device 300 has been illustrated and described, one of skill in the art in possession of the present disclosure will recognize that router devices (or other devices operating according to the teachings of the present disclosure in a manner similar to that described below for the router device 300) may include a variety of components and/or component configurations for providing conventional router device functionality, as well as the functionality discussed below, while remaining within the scope of the present disclosure as well.

Figure 4:
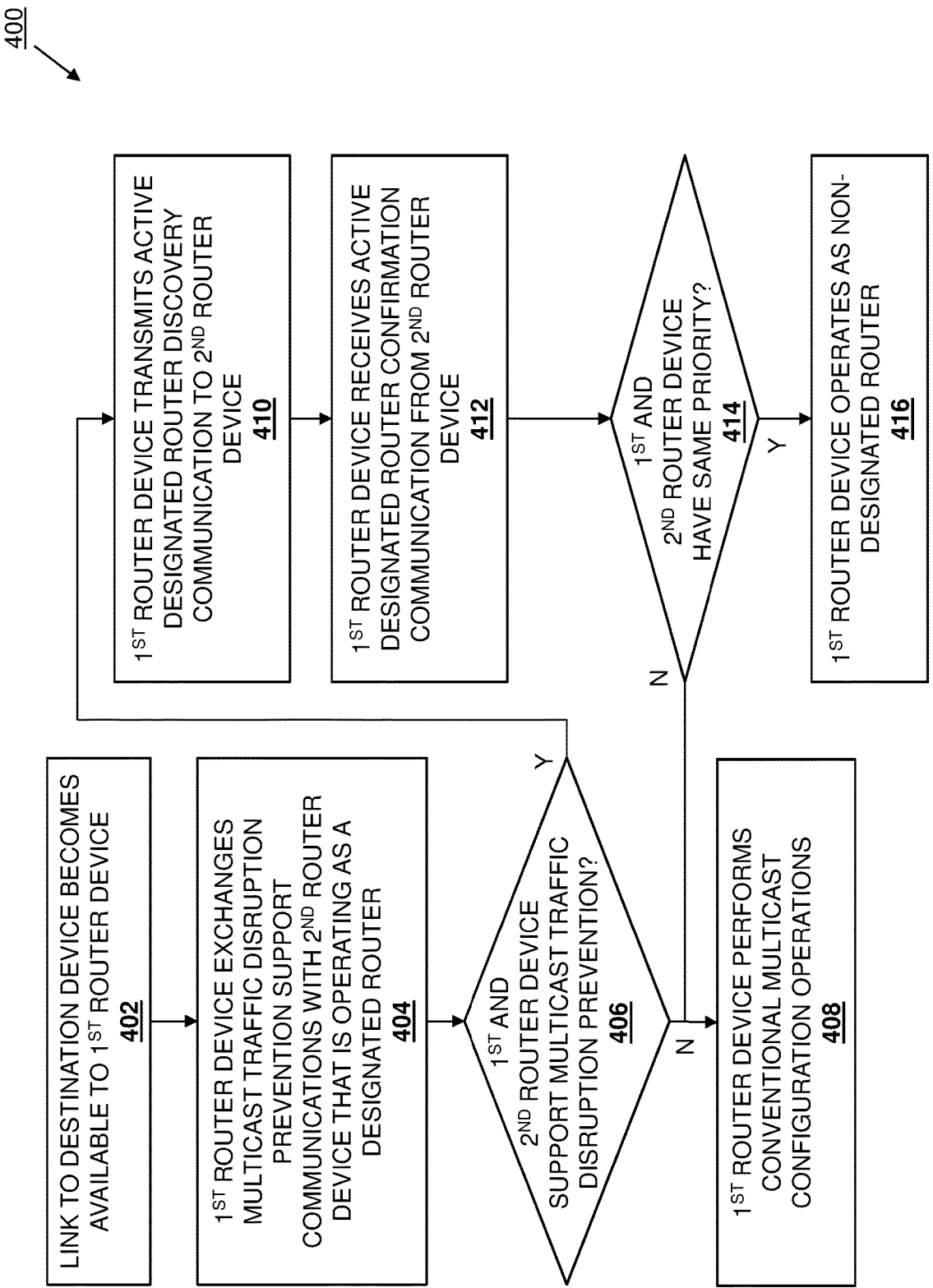
FIG. 4 is a flow chart illustrating an embodiment of a method for preventing multicast traffic disruptions.

Referring now to FIG. 4, an embodiment of a method 400 for preventing multicast traffic disruptions is illustrated. As discussed below, the systems and methods of the present disclosure operate to prevent the re-designation of the designated router between multiple router devices having the same priority in order to eliminate the performance of the operations required to perform that re-designation, and prevent the data traffic disruptions that can occur as a result. For example, the multicast traffic disruption prevention system includes a first router device, and a second router device that is associated with a first priority, that is coupled to the first router device, and that is operating as a designated router such that the first router device transmits data traffic to the second router device for forwarding to a destination device. A third router device is associated with the first priority, is coupled to the first router device and the second router device, and in response to a link to the destination device becoming available, operates to transmit an active designated router discovery communication to the second router device that identifies the first priority associated with the third router device. If the third router device receives an active designated router confirmation communication from the second router device that identifies that the first priority is also associated with the second router device and that the second router device is configured to operate as the designated router, it operates as a non-designated router such that the first router device continues to transmit data traffic to the second router device for forwarding to the destination device. Thus, when multiple router devices having the same priority are available to forward data traffic to a destination device, the router device that is actively operating as the designated router will continue to do so in order to prevent possible data traffic disruptions that might occur by changing the designated router designation between those router devices.

Figure 6A:
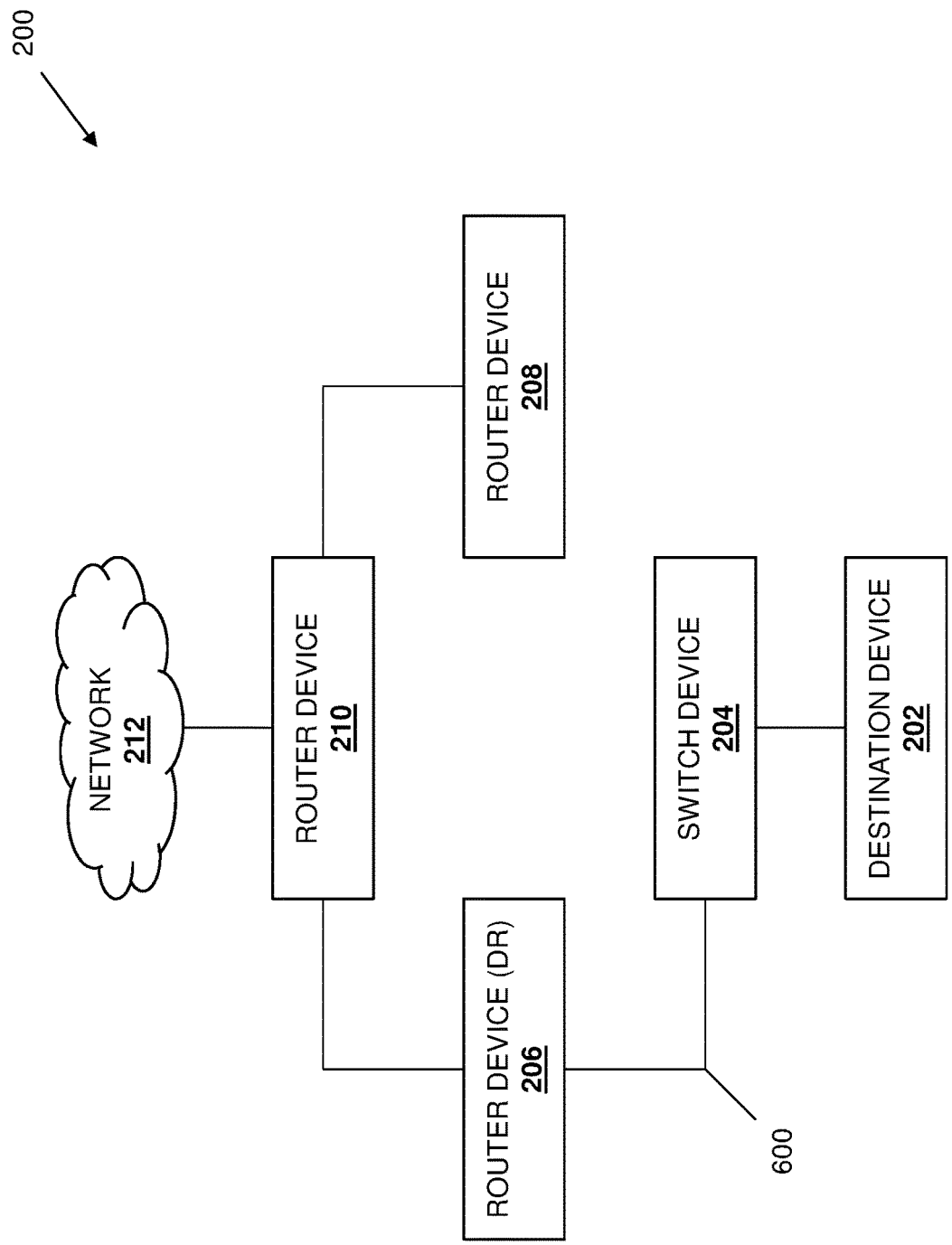
FIG. 6A is a schematic view illustrating an embodiment of the multicast traffic disruption prevention system of FIG. 2 operating during the method of FIG. 5.

The method 400 begins at block 402 where a link to a destination device becomes available to a first router device. With reference to FIG. 6A, at or prior to block 402, the router device 206 may be coupled to the switch device 204 via one or more links 600 and may be configured to operate as a Designated Router (DR) (as indicated by the "DR" designation on the router device 206 in FIG. 6A). In some embodiments, the router device 206 may have operated as discussed below with regard to FIGS. 7A and 7B in order to configure itself to operate as the designated router, although one of skill in the art in possession of the present disclosure will recognize that the designation of the router device 206 as the designated router (e.g., according to PIM) may be performed in a variety of manners that will fall within the scope of the present disclosure as well. As such, the router device 210 may operate to receive data traffic that is destined for the destination device 202 via the network 212 and, in response, forward that data traffic to the router device 206 that is operating as the designated router so that the router device may forward that data traffic via the switch device 204 to the destination device 202.

Figure 6B:
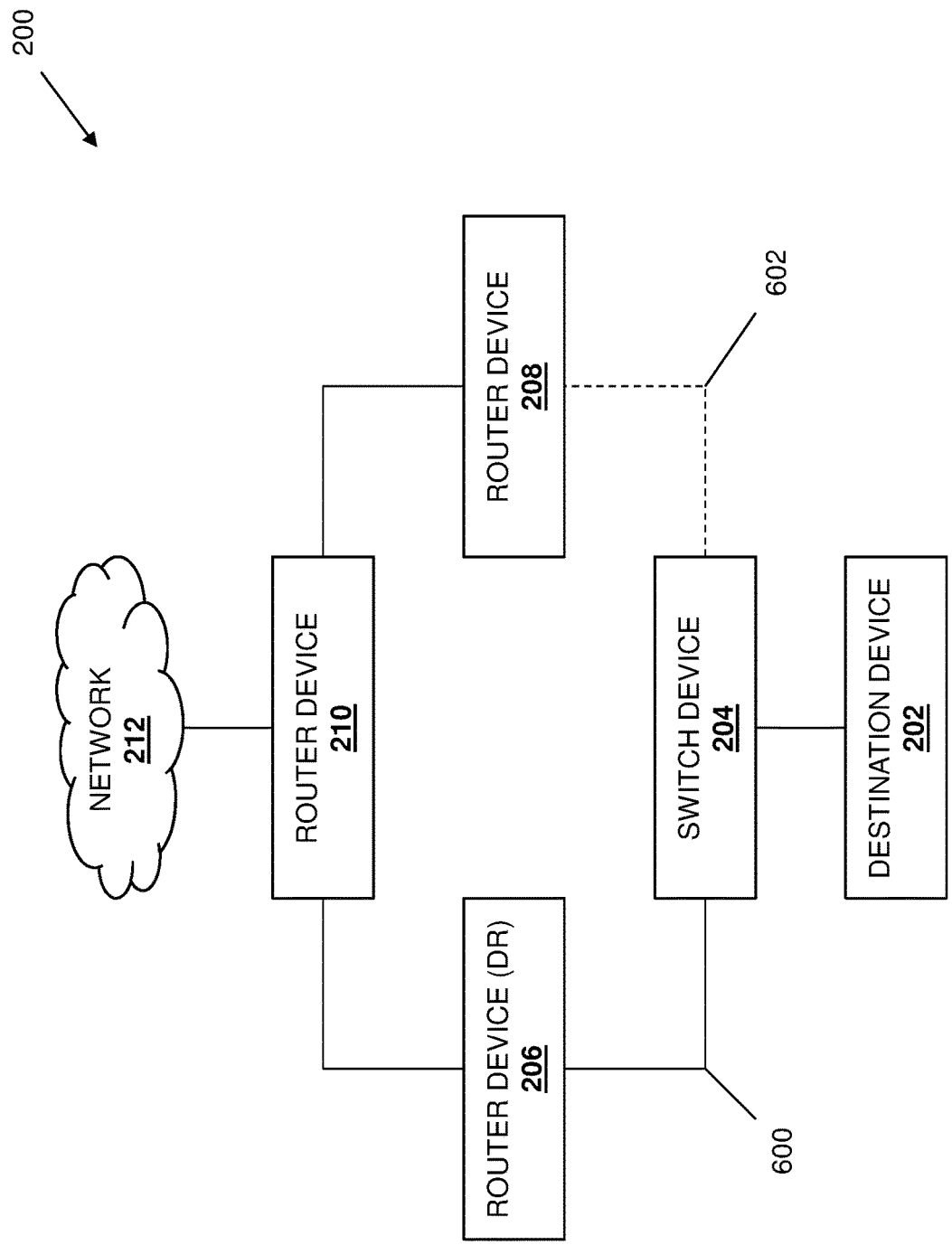
FIG. 6B is a schematic view illustrating an embodiment of the multicast traffic disruption prevention system of FIG. 2 operating during the method of FIG. 5.

With reference to FIG. 6B, in an embodiment of block 402, one or more links 602 may become available between the router device 208 and the switch device 204. For example, the link(s) 602 may be "new" or otherwise added between the router device 208 and the switch device 204 (e.g., via cabling connected between the router device 208 and the switch device 204), the link(s) 602 may become available after a reboot of the router device(s) 206 and/or 208 (e.g., a reboot in a PIM converged LAN segment having router devices both configured with a default priority as discussed below), or the link(s) 602 may become available following recovery from a failure of the router device(s) 206 and/or 208 (e.g., a failure in a PIM converged LAN segment having router devices both configured with a default priority as discussed below). However, while a few specific examples are provided, one of skill in the art in possession of the present disclosure will recognize that links that couple a router device to a destination device may become available in a variety of manners that will fall within the scope of the present disclosure as well.

The method 400 then proceeds to block 404 where the first router device exchanges multicast traffic disruption prevention support communications with a second router device that is operating as a designated router. In some embodiments of block 404, in response to (or prior to) the link(s) 602 becoming available to the router device 208, the router devices 206 and 208 may exchange multicast traffic disruption prevention support communications in order to, for example, confirm whether each of the router devices 206 and 208 support the multicast traffic disruption prevention functionality of the present disclosure. For example, with reference to FIG. 5 and prior to or following the link(s) 602 becoming available at block 402, the multicast traffic disruption prevention engine 304 in the router device 208/300 may generate a multicast traffic disruption prevention support identification communication 500 that indicates that the router device 208 supports the multicast traffic disruption prevention functionality of the present disclosure, and transmit the multicast traffic disruption prevention support identification communication 500 via its communication system 308 and to the switch device 204 such that the switch device 204 forwards the multicast traffic disruption prevention support identification communication 500 to the router device 206. In a specific example, the multicast traffic disruption prevention support identification communication 500 may include an "enhanced" PIM hello packet that includes a reserved field that identifies (e.g., via a function-feature negotiation bit set to 0 or 1) that the router device 208 supports the multicast traffic disruption prevention functionality of the present disclosure.

Figure 5:
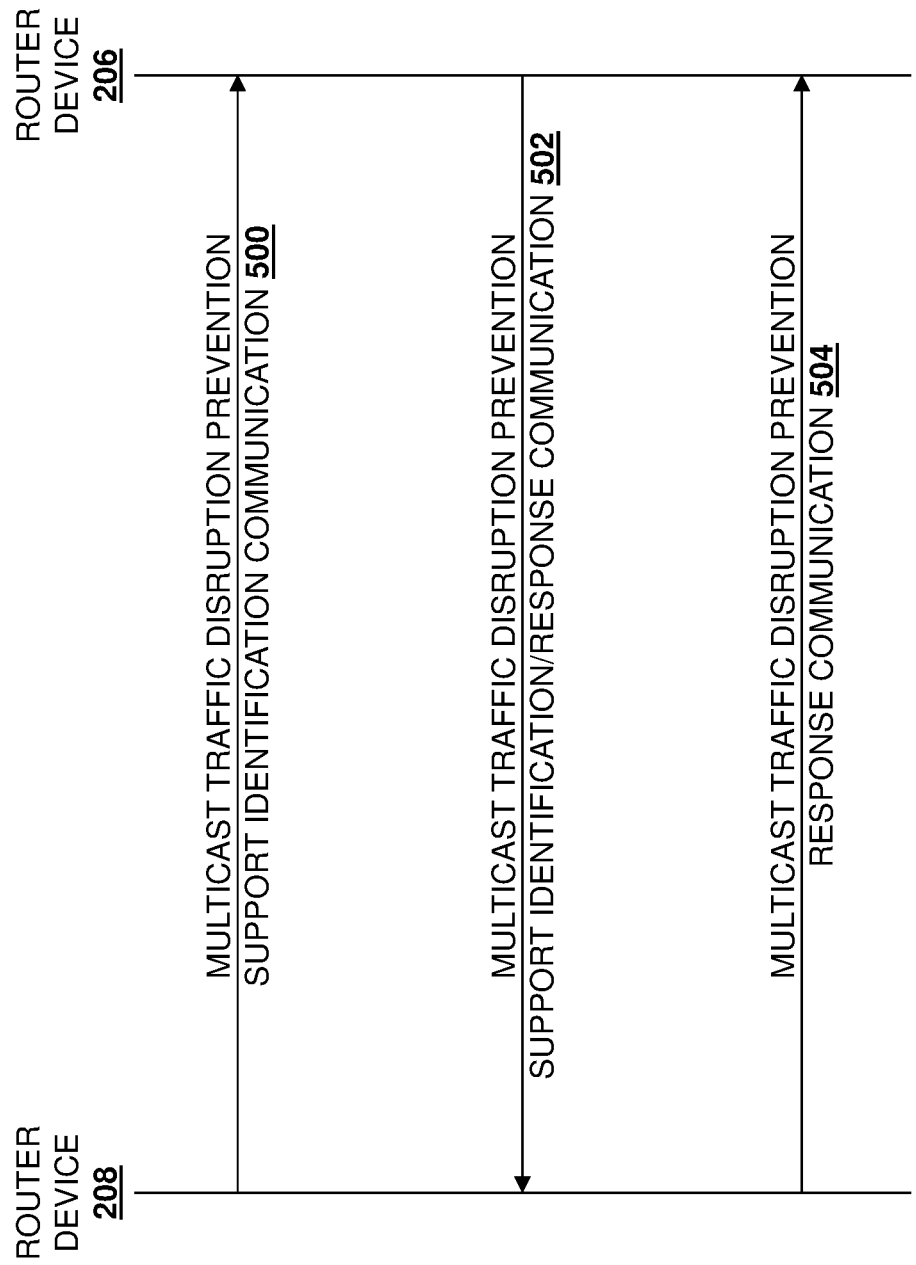
FIG. 5 is a swim-lane diagram illustrating an embodiment of communications exchanged between router devices in the multicast traffic disruption prevention system of FIG. 2.

As illustrated in FIG. 5, the multicast traffic disruption prevention engine 304 in the router device 206/300 may receive the multicast traffic disruption prevention support identification communication 500 and, in the event the router device 206 supports the multicast traffic disruption prevention functionality of the present disclosure, may generate a multicast traffic disruption prevention support identification/response communication 502 that indicates that the router device 208 supports the multicast traffic disruption prevention functionality of the present disclosure, and transmit the multicast traffic disruption prevention support identification/response communication 502 via its communication system 308 and to the switch device 204 such that the switch device 204 forwards the multicast traffic disruption prevention support identification/response communication 502 to the router device 208. Similarly as discussed above, in specific examples the multicast traffic disruption prevention support identification/response communication 502 may include an "enhanced" PIM hello packet that includes a reserved field that identifies (e.g., via a function-feature negotiation bit set to 0 or 1) that the router device 206 supports the multicast traffic disruption prevention functionality of the present disclosure.

As illustrated in FIG. 5, the multicast traffic disruption prevention engine 304 in the router device 208/300 may receive the multicast traffic disruption prevention support identification/response communication 502 and, in response, may generate a multicast traffic disruption prevention support response communication 504 that indicates that the router device 208 received the multicast traffic disruption prevention support identification/response communication 502, and transmit the multicast traffic disruption prevention support response communication 504 via its communication system 308 and to the switch device 204 such that the switch device 204 forwards the multicast traffic disruption prevention support response communication 504 to the router device 206.

The method 400 then proceeds to decision block 406 where it is determined whether both the first and second router devices support multicast traffic disruption prevention. In an embodiment, at decision block 406 and based on the multicast traffic disruption prevention support communications exchanged at block 404, the router devices 206 and 208 may determine whether the multicast traffic disruption prevention functionality of the present disclosure is supported. As will be appreciated by one of skill in the art in possession of the present disclosure, the multicast traffic disruption prevention functionality "handshake" negotiation discussed above with reference to block 404 may require agreement between available router devices (i.e., PIM router devices in a LAN segment) in order for the multicast traffic disruption prevention functionality discussed below to be supported, and thus the multicast traffic disruption prevention engines 304 in the router devices 206/300 and 208/300 may perform any of a variety of handshake/negotiation operations in order to determine whether the multicast traffic disruption prevention functionality of the present disclosure is supported. However, while specific handshake/negotiation operations are described, one of skill in the art in possession of the present disclosure will appreciate that other techniques for supporting the multicast traffic disruption prevention functionality discussed below will fall within the scope of the present disclosure as well.

If at decision block 406, it is determined that at least one of the first and second router devices do not support multicast traffic disruption prevention, the method 400 proceeds to block 408 where the first router device performs conventional multicast configuration operations. In an embodiment, at block 408 and in the event the multicast traffic disruption prevention engine 304 in the router device 208/300 determines that the multicast traffic disruption prevention functionality is not supported by the router device 206, the multicast traffic disruption prevention engine 304 in the router device 208/300 will perform conventional multicast configuration operations (e.g., via conventional PIM control packet exchange operations and/or other PIM operations known in the art). For example, as discussed above, conventional multicast configuration operations may include designating one of a plurality of router devices as the designated router based on relative priorities of those router devices and, in the event those priorities are the same, based on Internet Protocol (IP) addresses utilized by those router devices.

Figure 6C:
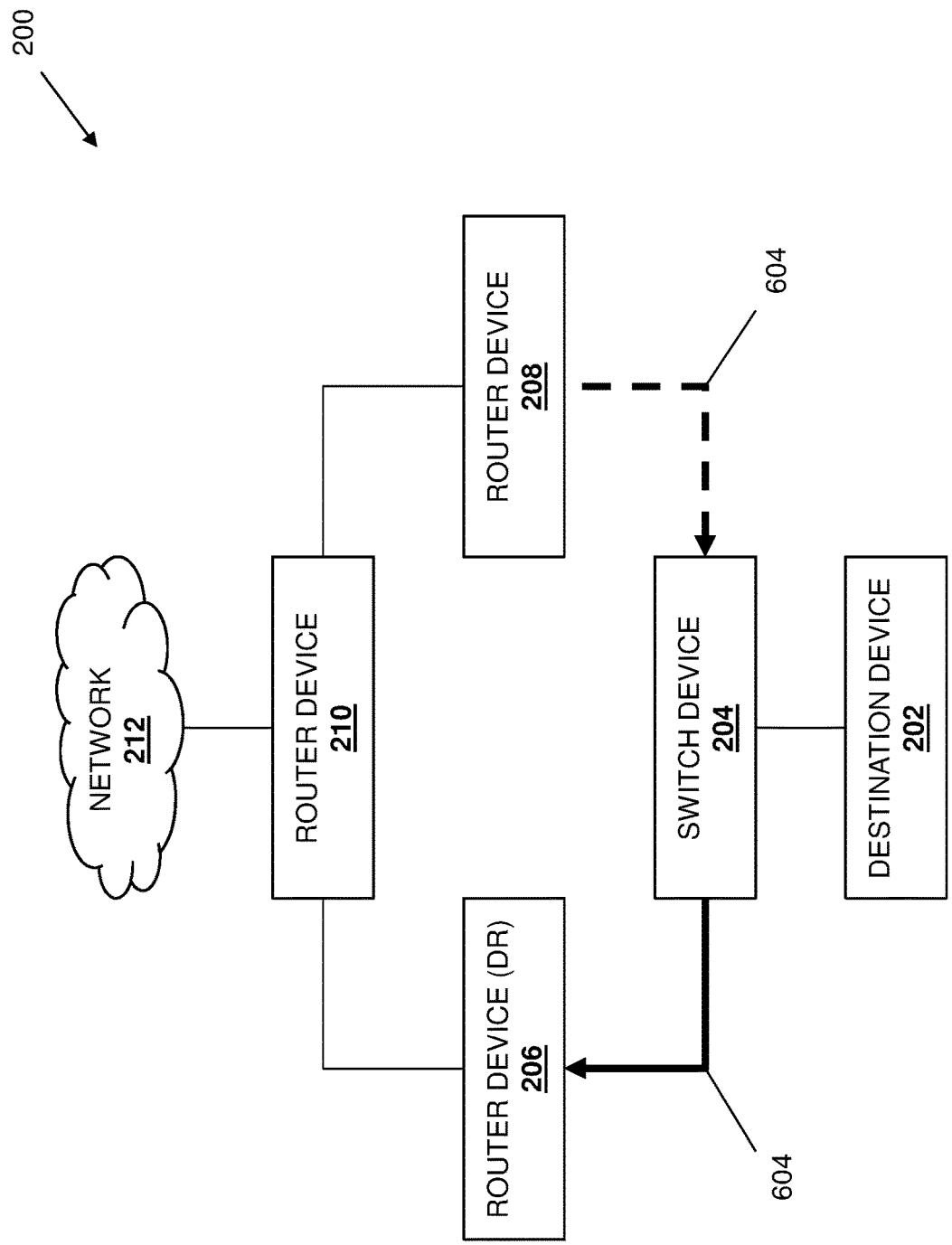
FIG. 6C is a schematic view illustrating an embodiment of the multicast traffic disruption prevention system of FIG. 2 operating during the method of FIG. 5.

In a specific example, each of the router devices 206 and 208 may be configured with the same priority (e.g., a default priority that is the same for both router devices 206 and 208), with the router device 206 configured with an IP address "192.168.1.1", and the router device 208 configured with an IP address "192.168.1.2". In this example, the conventional multicast configuration operations at block 408 may operate to determine that the priorities for each of the router devices 206 and 208 are the same, and then use an IP address ranking scheme that operates to rank the "192.168.1.2" IP address of the router device 208 "higher" than the "192.168.1.1" IP address of the router device 206 (i.e., due to the "0.2" ending of the IP address of the router device 208 being "higher" than the "0.1" ending of the IP address of the router device 206). Thus, those conventional multicast configuration operations would result in a designated router re-election that designates the router device 208 as the "new" designated router, as well as associated multicast re-convergence operations that require considerable processing by the router devices 206 and 208 in order to perform multicast tree flushes, membership state rebuilds, multicast tree building to the data traffic source or a rendezvous point, hardware port state reprogramming, designated role re-election, and/or other multicast re-convergence operations known in the art. As discussed above, during such multicast re-convergences, data traffic disturbances may occur that can lead to data traffic losses If, at decision block 406, it is determined that both the first and second router devices support multicast traffic disruption prevention, the method 400 proceeds to block 410 where the first router device transmits an active designated router discovery communication to the second router device. With reference to FIG. 6C, in an embodiment of block 410, the multicast traffic disruption prevention engine 304 in the router device 208/300 may operate to perform active designated router discovery communication operations 604 that include generating an active designated router discovery communication and transmitting the active designated router discovery communication via its communication system 308 to the switch device 204 such that the switch device 204 forwards the active designated router discovery communication to the router device 206. In a specific example, the active designated router discovery communication may include a PIM hello packet with an "enhanced" PIM hello header that includes reserved bits that may be used to set an "active designated router" flag. Furthermore, the active designated router discovery communication may also include parameters (e.g., PIM hello parameters) such as the priority of the router device 208, the IP address of the router device 208, and/or any other parameters that would be apparent to one of skill in the art in possession of the present disclosure.

As such, in this example in which the router device 208 is attempting to discover if an active designated router is present, the active designated router discovery communication/PIM hello packet may include a PIM hello header with its reserved bits set at "00" to provide an "active designated router" flag that indicates that the router device 208 is attempting to discover if any router devices are currently/actively operating as a designated router in the LAN segment that the router device 208 is now a part of, as well as the default priority of the router device 208 as described in the example provided above, and the IP address "192.168.1.2" of the router device 208 as described in the example below.

The method 400 then proceeds to block 412 where the first router device receives an active designated router confirmation communication from the second router device. With reference to FIG. 6D, in an embodiment of block 412, the multicast traffic disruption prevention engine 304 in the router device 206/300 may receive the active designated router discovery communication and, in response, may operate to perform active designated router confirmation communication operations 606 that include generating an active designated router confirmation communication and transmitting the active designated router confirmation communication via its communication system 308 to the switch device 204 such that the switch device 204 forwards the active designated router confirmation communication to the router device 208. Similarly as discussed above, the active designated router confirmation communication may include a PIM hello packet with an "enhanced" PIM hello header that includes reserved bits that may be used to set an "active designated router" flag. Furthermore, the active designated router discovery communication may also include parameters (e.g., PIM hello parameters) such as the priority of the router device 206, the IP address of the router device 206, and/or any other parameters that would be apparent to one of skill in the art in possession of the present disclosure.

As such, in this example in which the router device 206 is currently/actively operating as an active designated router, the active designated router confirmation communication/PIM hello packet may include a PIM hello header with its reserved bits set at "01" to provide an "active designated router" flag that indicates that the router device 206 is currently/actively operating as a designated router in the LAN segment that the router device 208 is now a part of, as well as the default priority of the router device 206 as described in the example provided above, and the IP address "192.168.1.1" of the router device 206 as described in the example below The method 400 then proceeds to decision block 414 where it is determined whether the first and second router devices have the same priority. In an embodiment, at decision block 414, the multicast traffic disruption prevention engine 304 in the router devices 206/300 and 208/300 may operate to determine whether they have the same priority. As will be appreciated by one of skill in the art in possession of the present disclosure, the exchange of the active designated router discovery communication and the active designated router confirmation communication allows each of the router devices 206 and 208 to compare their priority to the priority of the other router device, and one of skill in the art in possession of the present disclosure will recognize how such a comparison may be used to determine whether those priorities match at decision block 414.

If at decision block 414, it is determined that the first and second router devices do not have the same priority, the method 400 proceeds to block 408 where the first router device performs conventional multicast configuration operations. In an embodiment, at block 414 and in response to the router devices 206 and 208 determining that they do not have the same priority, the multicast traffic disruption prevention engine 304 in the router devices 206/300 and 208/300 may operate to perform conventional multicast configuration operations at block 408 that, as discussed above, with designate the one of the router devices 206 and 208 with the highest priority as the designated router. Thus, in situations where the router devices 206 and 208 have different priorities (an example of which is provided in further detail below), the router device with the highest priority will be designated as the designated router, thus allowing a user to select which router device should operate as the designated router using conventional priority techniques.

If, at decision block 414, it is determined that the first and second router devices have the same priority, the method 400 proceeds to block 416 where the first router device operates as a non-designated router. In an embodiment, at block 416 and in response to the router devices 206 and 208 determining that they have the same priority, the multicast traffic disruption prevention engine 304 in the router device 208/300 will operate as a non-designated router, which may include the multicast traffic disruption prevention engine 304 in the router device 208/300 performing any of a variety of multicast configuration operations that one of skill in the art in possession of the present disclosure would recognize as causing the router device 208 to operate as a non-designated router while the router device 206 continues to operate as the designated router. As such, the router device 210 may continue to operate to receive data traffic that is destined for the destination device 202 via the network 212 and, in response, forward that data traffic to the router device 206 operating as the designated router so that the router device may forward that data traffic via the switch device 204 to the destination device 202. Thus, the operation of the router device 208 as a non-designated router in the event that the router device is currently/actively operating as the designated router and the router devices 206 and 208 have the same priority will prevent a designated router re-election that would otherwise occur according to conventional multicast configuration operations based on the router device 208 having a higher ranked IP address than the router device 206 (as discussed in the example, above), as well as associated multicast re-convergence operations that can result in data traffic disturbances may occur that can lead to data traffic losses.

Figure 7A:
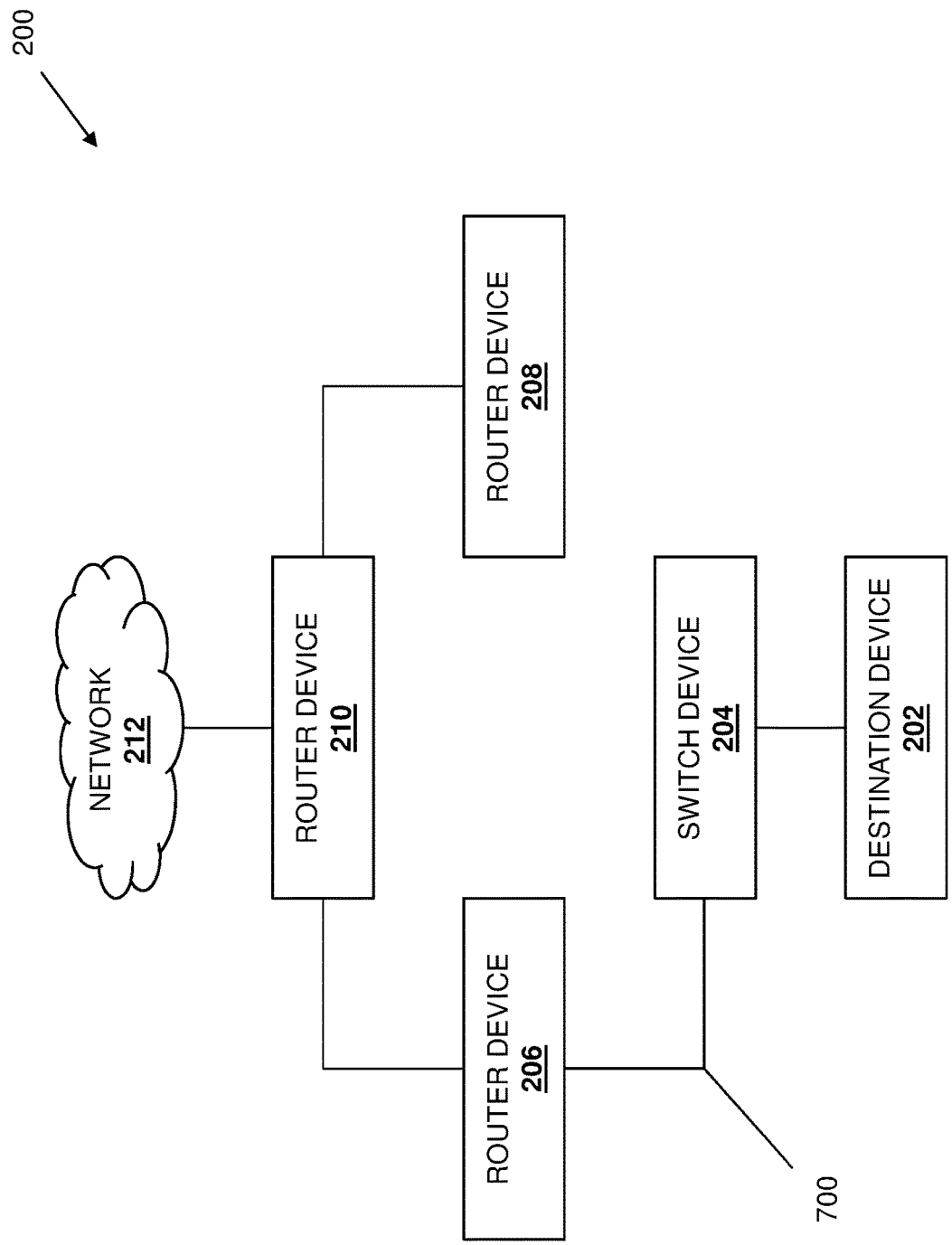
FIG. 7A is a schematic view illustrating an embodiment of the multicast traffic disruption prevention system of FIG. 2 operating during the method of FIG. 5.
Figure 7B:
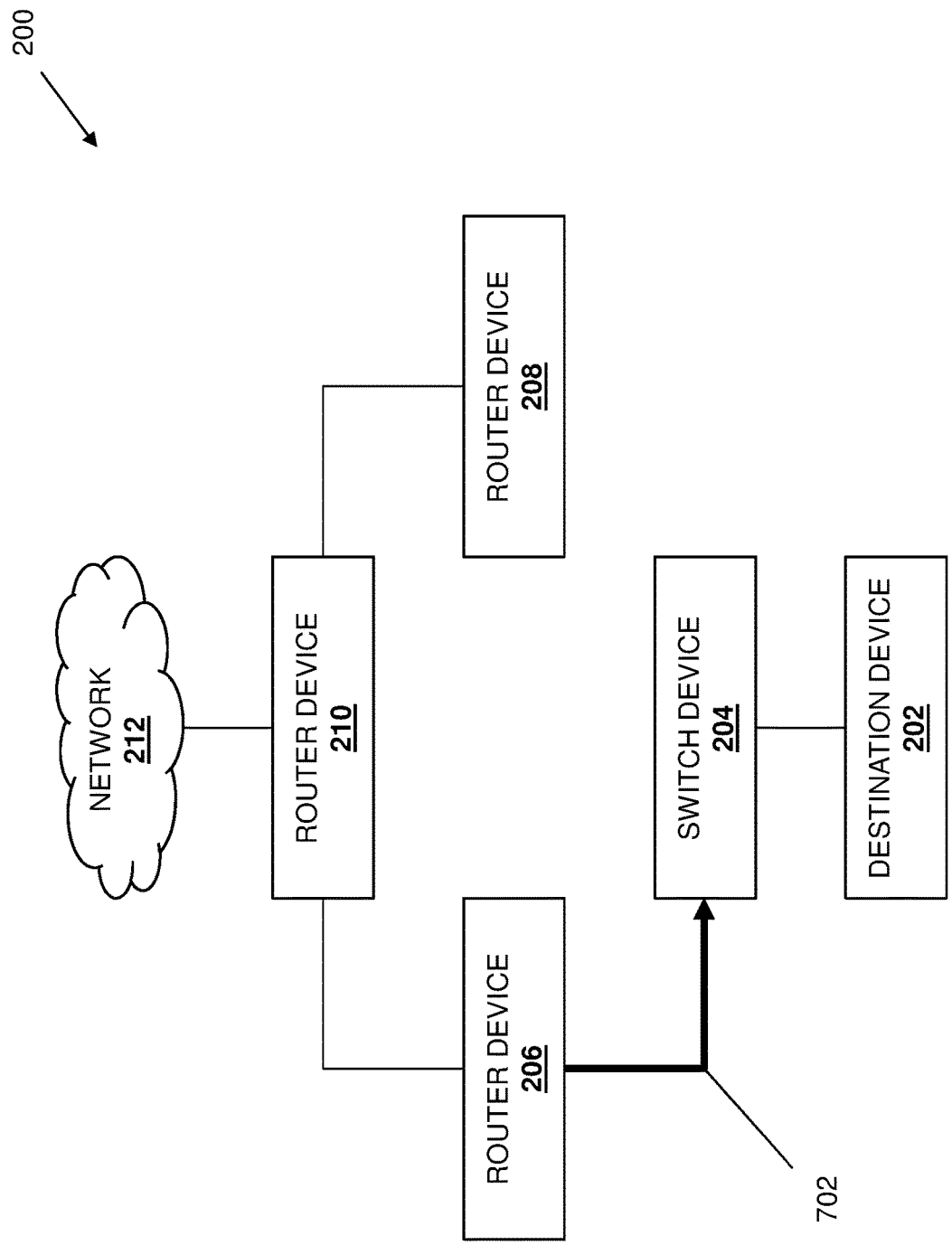
FIG. 7B is a schematic view illustrating an embodiment of the multicast traffic disruption prevention system of FIG. 2 operating during the method of FIG. 5.
Figure 7C:
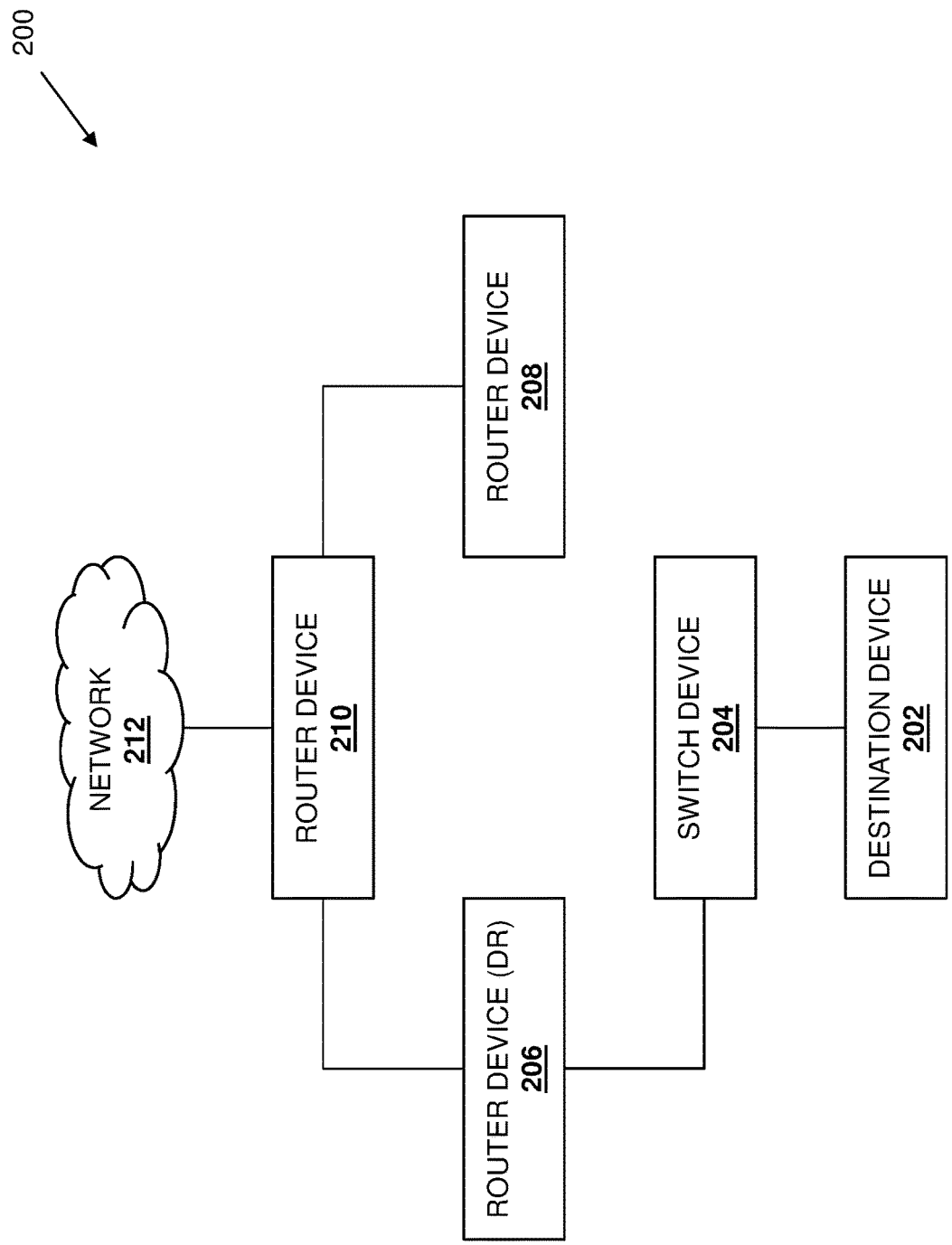
FIG. 7C is a schematic view illustrating an embodiment of the multicast traffic disruption prevention system of FIG. 2 operating during the method of FIG. 5.

With reference to FIGS. 7A, 7B, and 7C, an example of operation of the multicast traffic disruption prevention system of the present disclosure is provided in which a link becomes available between a router device and a destination device when no designated router is currently active in the LAN segment. For example, FIG. 7A illustrates how a link 700 may become available between the router device 206 and the switch device 204 (e.g., similarly as described above with regard to block 402 of the method 400) when no designated router is currently active. As will be appreciated by one of skill in the art in possession of the present disclosure, blocks 404 and 406 of the method 400 described above may not be performed in this embodiment due to the lack of the presence of other router devices.

With reference to FIG. 7B, the multicast traffic disruption prevention engine 304 in the router device 206/300 may then perform active designated router discovery operations 702 that include generating an active designated router discovery communication and transmitting that active designated router discovery communication to the switch device 204 similarly as described above with regard to block 410 (e.g., the active designated router discovery communication/PIM hello packet may include a PIM hello header with its reserved bits set at "00" to provide an "active designated router" flag that indicates that the router device 206 is attempting to discover if any router devices are currently/actively operating as a designated router in the LAN segment that the router device 206 is now a part of, as well as the priority of the router device 206, and the IP address of the router device 206).

In this example, there are no other router devices present and, as such, the router device 206 will not receive back any active designated router confirmation communication as described above with regard to block 412. In an embodiment, the multicast traffic disruption prevention engine 304 in the router device 206/300 may be configured to wait a time period following the transmission of the active designated router discovery communication and, once that time period has passed, operate as a designated router, which may include the multicast traffic disruption prevention engine 304 in the router device 206/300 performing any of a variety of multicast configuration operations that one of skill in the art in possession of the present disclosure would recognize as causing the router device 206 to operate as a designated router. As such, the router device 210 may operate to receive data traffic that is destined for the destination device 202 via the network 212 and, in response, forward that data traffic to the router device 206 operating as the designated router so that the router device may forward that data traffic via the switch device 204 to the destination device 202. Thus, the multicast traffic disruption prevention system of the present disclosure provides for the designation of the first router device to provide a link to a destination device as a designated router.

Figure 8A:
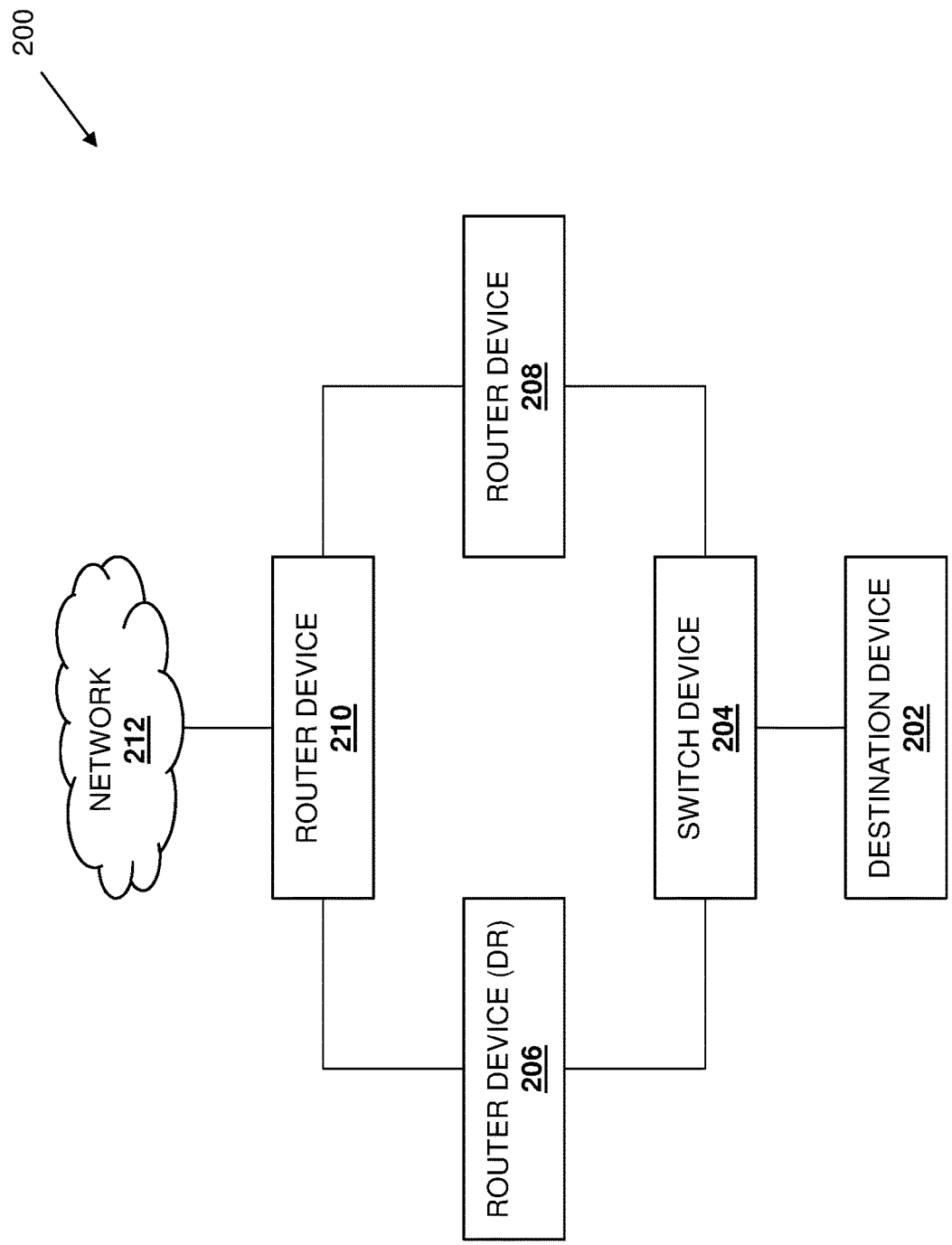
FIG. 8A is a schematic view illustrating an embodiment of the multicast traffic disruption prevention system of FIG. 2 operating during the method of FIG. 5.
Figure 8B:
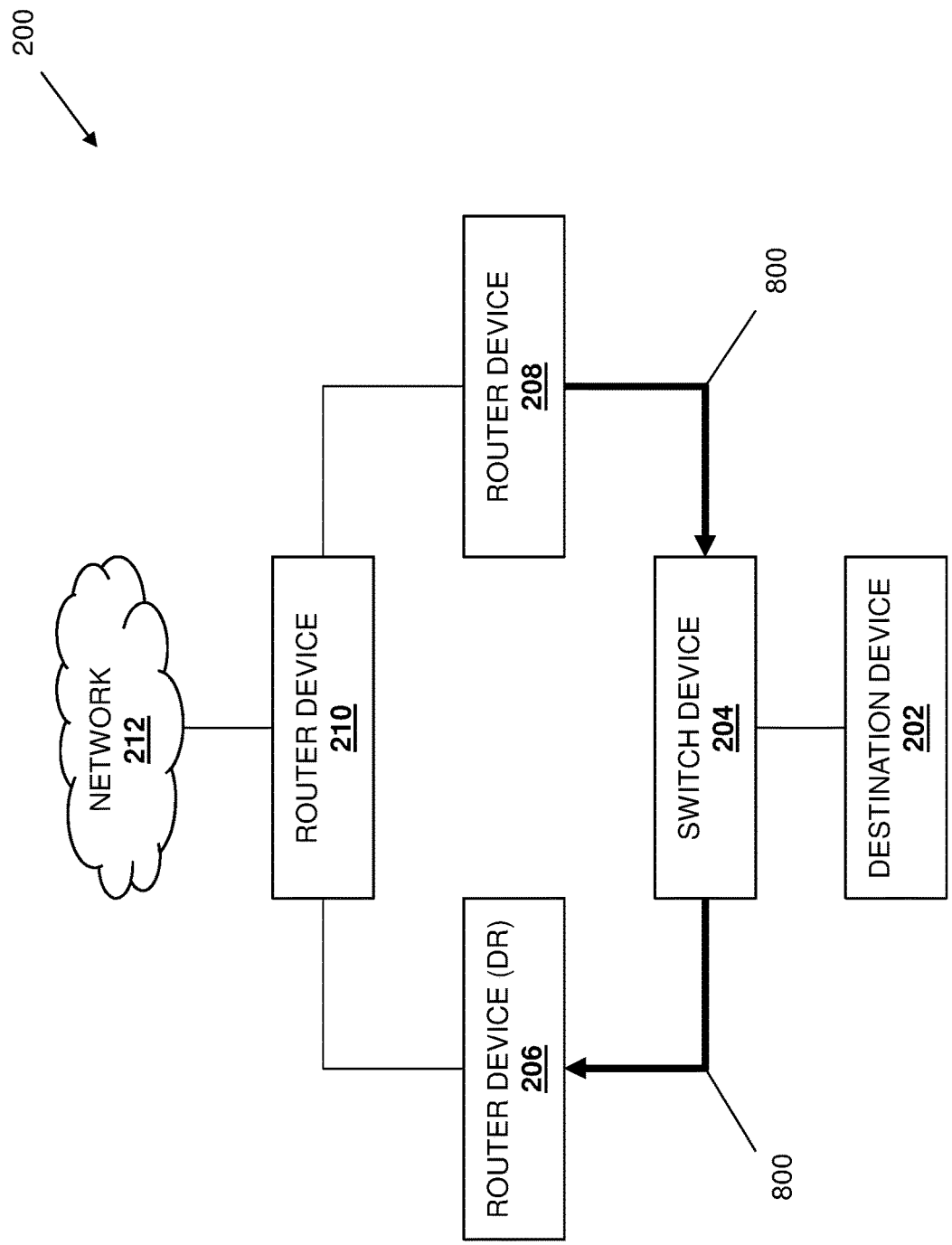
FIG. 8B is a schematic view illustrating an embodiment of the multicast traffic disruption prevention system of FIG. 2 operating during the method of FIG. 5.
Figure 8C:
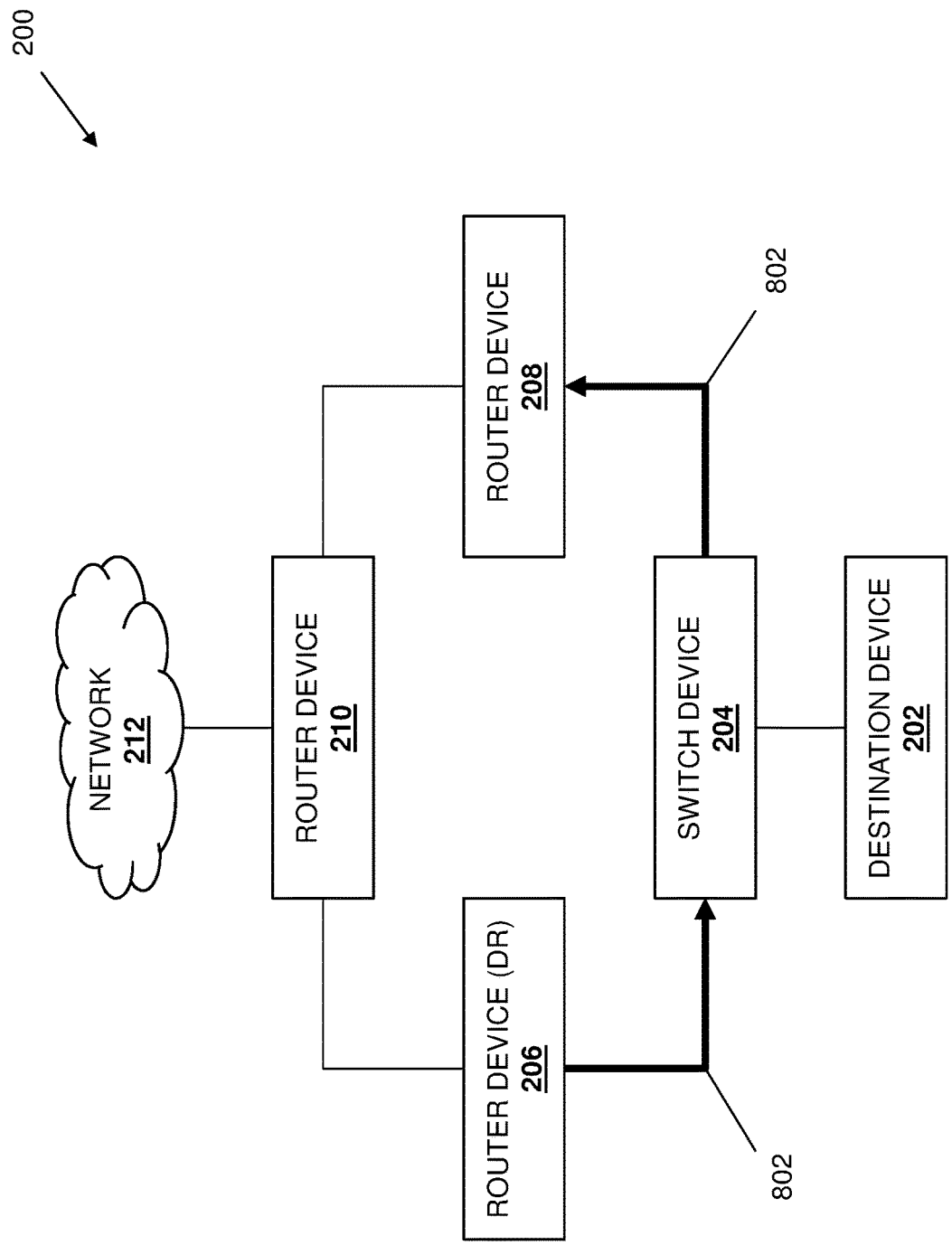
FIG. 8C is a schematic view illustrating an embodiment of the multicast traffic disruption prevention system of FIG. 2 operating during the method of FIG. 5.
Figure 8D:
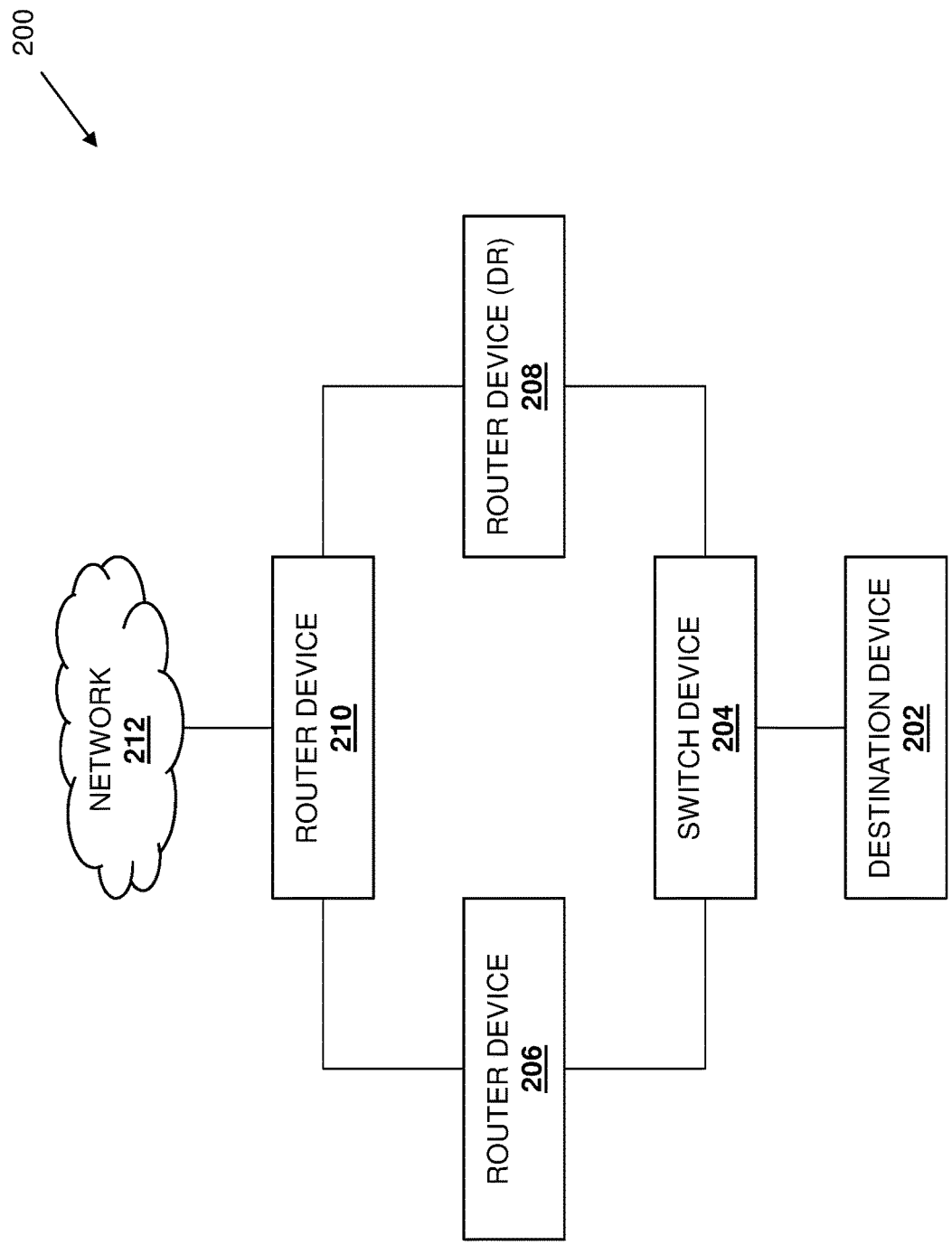
FIG. 8D is a schematic view illustrating an embodiment of the multicast traffic disruption prevention system of FIG. 2 operating during the method of FIG. 5.

With reference to FIGS. 8A, 8B, 8C, and 8D, an example of operation of the multicast traffic disruption prevention system of the present disclosure is provided in which a user prioritizes a router device over other router devices in a manner that changes the designated router. For example, FIG. 8A illustrates how each of the router devices 206 and 208 may include links to the switch device 204, with the router device 206 operating as the designated router in this example. As such, in some embodiments, the router device 206 may operate as the designated router according to the method 400 discussed above when both of the router devices 206 and 208 include the same priority and the router device 206 was previously operating as the designated router (although other designated router scenarios will fall within the scope of the present disclosure as well). In this example, the user of the multicast traffic disruption prevention system 200 may operate to change the priority of the router device 208 such that the priority of the router device 208 is higher than the priority of the router device 206. For example, the user may wish to transmit data traffic (e.g., multicast group join/leave traffic, etc.) via the router device 208 rather than the router device 206 and, in response, will set the priorities of the router device(s) 206 and 208 accordingly.

In an embodiment, in response to the priority change, the multicast traffic disruption prevention engine 304 in the router device 208/300 may operate to perform active designated router discovery operations 800 that include generating an active designated router discovery communication and transmitting that active designated router discovery communication to the switch device 204 similarly as described above with regard to block 410 (e.g., the active designated router discovery communication/PIM hello packet may include a PIM hello header with its reserved bits set at "00" to provide an "active designated router" flag that indicates that the router device 208 is attempting to discover if any router devices are currently/actively operating as a designated router in the LAN segment that the router device 208 is now a part of, as well as the new priority of the router device 208, and the IP address of the router device 208).

In response to receiving the active designated router discovery communication, the multicast traffic disruption prevention engine 304 in the router device 206/300 may operate to perform active designated router confirmation operations 802 that include generating an active designated router confirmation communication and transmitting that active designated router confirmation communication to the switch device 204 similarly as described above with regard to block 412 (e.g., the active designated router confirmation communication/PIM hello packet may include a PIM hello header with its reserved bits set at "01" to provide an "active designated router" flag that indicates that the router device 206 is currently/actively operating as a designated router in the LAN segment that includes the router devices 206 and 208, as well as the priority of the router device 208, and the IP address of the router device 208).

In this example, at decision block 414, the multicast traffic disruption prevention engines 304 in the router devices 206/300 and 208/300 will determine that the router device 208 now has a higher priority than the router device 206 at decision block 414 and, in response, the router device 208 will begin operating as a designated router and the router device 206 will begin operating as a non-designated router following conventional multicast configuration operations at block 408, which may include the multicast traffic disruption prevention engine 304 in the router devices 206/300 and 208/300 performing any of a variety of multicast configuration operations that one of skill in the art in possession of the present disclosure would recognize as causing the router device 206 to operate as a non-designated router and the router device 208 to operate as a designated router. As such, the router device 210 may operate to receive data traffic that is destined for the destination device 202 via the network 212 and, in response, forward that data traffic to the router device 208 operating as the designated router so that the router device may forward that data traffic via the switch device 204 to the destination device 202. Thus, the multicast traffic disruption prevention system of the present disclosure provides for the re-designation of the designated router to a router device based on an updated or changed priority of that router device.

Thus, systems and methods have been described that prevent the re-designation of the designated router between multiple router devices having the same priority in order to eliminate the performance of the operations required to perform that re-designation, and prevent the data traffic disruptions that can occur as a result. For example, the multicast traffic disruption prevention system includes a first router device, and a second router device that is associated with a first priority, that is coupled to the first router device, and that is operating as a designated router such that the first router device transmits data traffic to the second router device for forwarding to a destination device. A third router device is associated with the first priority, is coupled to the first router device and the second router device, and in response to a link to the destination device becoming available, operates to transmit an active designated router discovery communication to the second router device that identifies the first priority associated with the third router device. If the third router device receives an active designated router confirmation communication from the second router device that identifies that the first priority is also associated with the second router device and that the second router device is configured to operate as the designated router, it operates as a non-designated router such that the first router device continues to transmit data traffic to the second router device for forwarding to the destination device. Thus, when multiple router devices having the same priority are available to forward data traffic to a destination device, the router device operating as the designated router will continue to do so in order to prevent possible data traffic disruptions that might occur by changing the designated router designation between those router devices Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multicast traffic disruption prevention system, comprising:
    a first router device;
    a second router device that is associated with a first priority, wherein the second router device is coupled to the first router device and is operating as a designated router such that the first router device transmits data traffic to the second router device for forwarding to a destination device; and
    a third router device that is associated with the first priority, wherein the third router device is coupled to the first router device and the second router device and is configured to:
        transmit, in response to a link to the destination device becoming available, an active designated router discovery communication to the second router device that identifies the first priority associated with the third router device;
        receive an active designated router confirmation communication from the second router device that identifies that the first priority is also associated with the second router device and that the second router device is configured to operate as the designated router; and
        operate, in response to the first priority being associated with both the second router device and the third router device and the first router device being configured to operate as the designated router, as a non-designated router such that the first router device continues to transmit data traffic to the second router device for forwarding to the destination device.

2. The system of claim 1, wherein the second router device is associated with a first address, and wherein the third router device is associated with a second address that is ranked higher than the first address according to an address ranking scheme.

3. The system of claim 2, wherein the first address and the second address are provided by Internet Protocol (IP) addresses.

4. The system of claim 1, wherein the link to the destination device becomes available to the third router device in response to one of: the link being added to the third router device, the link recovering after a link failure, or the link becoming available following a reboot of the third router device.

5. The system of claim 1, wherein the active designated router discovery communication includes a Protocol Independent Multicast (PIM) hello message.

6. The system of claim 1, wherein the first priority is a default priority.

7. An Information Handling System (IHS), comprising:
    a processing system; and
    a memory system that is coupled to the processing system and that includes instructions that, when executed by the processing system, cause the processing system to provide a multicast traffic disruption prevention engine that is configured to:
        transmit, in response to a link to a destination device becoming available to the processing system, an active designated router discovery communication to a first router device that identifies a first priority associated with the IHS;

receive an active designated router confirmation communication from the first router device that identifies that the first priority is also associated with the first router device and that the first router device is configured to operate as a designated router such that a second router device transmits data traffic to the first router device for forwarding to the destination device; and operate, in response to the first priority being associated with both the IHS and the first router device and the first router device being configured to operate as the designated router, as a non-designated router such that the second router device continues to transmit data traffic to the first router device for forwarding to the destination device.

8. The IHS of claim 7, wherein the first router device is associated with a first address, and wherein the IHS is associated with a second address that is ranked higher than the first address according to an address ranking scheme.

9. The IHS of claim 8, wherein the first address and the second address are provided by Internet Protocol (IP) addresses.

10. The IHS of claim 7, wherein the link to the destination device becomes available to the processing system in response to one of: the link being added to the IHS, the link recovering after a link failure, or the link becoming available following a reboot of the IHS.

11. The IHS of claim 7, wherein the active designated router discovery communication includes a Protocol Independent Multicast (PIM) hello message.

12. The IHS of claim 7, wherein the first priority is a default priority.

13. The IHS of claim 7, wherein the multicast traffic disruption prevention engine is configured to:

exchange, prior to transmitting the active designated router discovery communication to the first router device, multicast traffic disruption prevention support communications with the first router device.

14. A method for preventing multicast traffic disruptions, comprising:

transmitting, by a first router device in response to a link to a destination device becoming available to the first router device, an active designated router discovery communication to a second router device that identifies a first priority associated with the first;

receiving, by the first router device, an active designated router confirmation communication from the second router device that identifies that the first priority is also associated with the second router device and that the second router device is configured to operate as a designated router such that a third router device transmits data traffic to the second router device for forwarding to the destination device; and operating, in response to the first priority being associated with both the first router device and the second router device and the second router device being configured to operate as the designated router, as a non-designated router such that the third router device continues to transmit data traffic to the second router device for forwarding to the destination device.

15. The method of claim 14, wherein the second router device is associated with a first address, and wherein the second router device is associated with a second address that is ranked higher than the first address according to an address ranking scheme.

16. The method of claim 15, wherein the first address and the second address are provided by Internet Protocol (IP) addresses.

17. The method of claim 14, wherein the link to the destination device becomes available to the first router device in response to one of: the link being added to the first router device, the link recovering after a link failure, or the link becoming available following a reboot of the first router device.

18. The method of claim 14, wherein the active designated router discovery communication includes a Protocol Independent Multicast (PIM) hello message.

19. The method of claim 14, wherein the first priority is a default priority.

20. The method of claim 14, further comprising:

exchanging, by the first router device prior to transmitting the active designated router discovery communication to the second router device, multicast traffic disruption prevention support communications with the second router device.

* * * * *